(12) United States Patent
Schwenk et al.

(10) Patent No.: US 7,555,649 B1
(45) Date of Patent: Jun. 30, 2009

(54) METHOD FOR GENERATING DIGITAL WATERMARKS FOR ELECTRONIC DOCUMENTS

(75) Inventors: Joerg Schwenk, Dieburg (DE); Friedrich Toensing, Hoechst (DE)

(73) Assignee: Deutsche Telekom AG (DE)

( * ) Notice: Subject to any disclaimer, the term of this patent is extended or adjusted under 35 U.S.C. 154(b) by 0 days.

(21) Appl. No.: 09/807,235

(22) PCT Filed: Sep. 23, 1999

(86) PCT No.: PCT/EP99/06187

§ 371 (c)(1), (2), (4) Date: Jun. 15, 2001

(87) PCT Pub. No.: WO00/22810

PCT Pub. Date: Apr. 20, 2000

(30) Foreign Application Priority Data

Oct. 9, 1998 (DE) ................................ 198 47 943

(51) Int. Cl.
*H04L 9/00* (2006.01)

(52) U.S. Cl. ...................................... 713/176; 382/100

(58) Field of Classification Search ................. 713/176, 713/178, 180, 181; 380/205, 201, 200; 382/100, 382/276

See application file for complete search history.

(56) References Cited

U.S. PATENT DOCUMENTS

| 5,373,561 | A | | 12/1994 | Haber et al. |
| 5,465,299 | A | | 11/1995 | Matsumoto et al. |
| 5,499,294 | A | | 3/1996 | Friedman |
| 5,636,292 | A | | 6/1997 | Rhoads |
| 5,689,567 | A | | 11/1997 | Miyauchi |
| 5,809,160 | A | | 9/1998 | Powell et al. |
| 6,101,602 | A | * | 8/2000 | Fridrich ...................... 713/176 |
| 6,504,941 | B2 | * | 1/2003 | Wong ......................... 382/100 |
| 6,636,615 | B1 | * | 10/2003 | Rhoads et al. ............. 382/100 |
| 2004/0263911 | A1 | * | 12/2004 | Rodriguez et al. ......... 358/3.28 |

FOREIGN PATENT DOCUMENTS

| DE | 19 615 3 01 | 10/1997 |
| EP | 0 845 758 | 11/1997 |
| EP | 0 859 503 | 8/1998 |
| EP | 0 905 967 | 3/1999 |
| WO | WO 97/07657 | 3/1997 |
| WO | WO 98/37513 | 8/1998 |
| WO | WO 98/44676 | 10/1998 |

OTHER PUBLICATIONS

U.S. Appl. No. 60/071,983, filed Jan. 20, 1998.*
Schneider M. et al., "A Robust Content Based Digital Signature For Image Authentication", Proceedings of the International Conference on Image Processing, US, IEEE, 1996, pp. 227-230.
Ruanaidh et al., "Watermarking Digital Images For Copyright Protection", IEE Proc-Vis. Image Signal Processing, vol. 143, No. 4, Aug. 1996, pp. 250-256.
JP Patent Abstracts of Japan: 10056557.
JP Patent Abstracts of Japan: 08139717.

* cited by examiner

*Primary Examiner*—Beemnet W Dada
(74) *Attorney, Agent, or Firm*—Kenyon & Kenyon LLP

(57) ABSTRACT

Verification of true authorship on the basis of digital watermarks is described. The digital watermark can be provided with the proof of identity id and/or with the hash value h(m) of the document and/or with a time value t.

6 Claims, No Drawings

METHOD FOR GENERATING DIGITAL WATERMARKS FOR ELECTRONIC DOCUMENTS

FIELD OF THE INVENTION

The present invention is directed to a method for generating digital watermarks for electronic documents.

BACKGROUND INFORMATION

Documents which exist in electronic form can be copied as often as desired without loss of quality. For that reason, reliable methods must be employed to prevent such documents from being freely disseminated without control, in order to protect the rights of the intellectual property owner.

Due to the rapid growth of the Internet and the capability it provides for digitally disseminating documents, there is an increased requirement to protect against the illegal dissemination of documents and, thus, to protect a copyright owner from pirated copies.

For this reason, large firms, such as IBM, NEC and Microsoft, and smaller firms as well, such as Digimarc (see Funkschau 17/97; p. 21) and research institutes, such as the Fraunhofer Company IGD and the GMD Darmstadt, have worked on embedding so-called digital watermarks in documents. In methods having such a basis, information identifying the copyright owner is introduced as invisible information into the documents to be protected. It is hidden in the document in such a way that no outsider can discover it. Only the owner himself can make the watermark visible by using his secret key and, therefore, in the case of a legal dispute, for example, prove that he is actually the owner.

There can be different kinds of inserted digital watermarks and, in this context, each can depend on the particular type of document (e.g., postscript, JPEG, MPEG-1).

Thus, for example, Schneider, M. et al., in the essay: "ROBUST CONTENT BASED DIGITAL SIGNATURE FOR IMAGE AUTHENTICATION" in Proc. Intl. Conference on Image Processing (ICIP) New York, U.S., IEEE, 1996, pp. 227-230, describe a method for embedding digital signatures as hidden signatures into the useful data for verifying the authenticity of data, i.e., proving that the data have been manipulated with, in that signatures are extracted using hash functions, and the result is combined with a private key, so that, altogether, a signature is formed which contains characteristics of the original work, as well as the identity of the author.

As described in this publication, such a signature can be transmitted concurrently with the data of the original work or also be hidden therein in such a way that it also serves the purpose of a watermark. Also, as described in this publication, the digital watermark can additionally be provided with an authentic time stamp.

U.S. Pat. No. 5,499,294 also describes generating a digital signature, which is associated with an original image and which encompasses both a hash value as well as a private key. However, this signature is not used in a watermark.

U.S. Pat. No. 5,809,160 describes a method for embedding signature information in original data as watermarks, however, without mentioning a hash function.

In addition, the abstracts of German Patent Application No. 196 15 301 and European Patent 0 845 758 A3 describe embedding a digital signature in data that need to be able to be authenticated, in each case a key or a secret key being combined with an extract of the data to form an embedded signature.

Digital watermarks make it possible for a copyright owner to prove that an illegally disseminated document is his or her intellectual property. However, digital watermarks do not make it possible to determine who the originator of the illegal dissemination is, nor to prove that such a person did in fact illegally disseminate the document. This is because, in contrast to electronic fingerprints, digital watermarks do not contain any indication of an authorized recipient of a copy of the document. If such a recipient himself wants to further disseminate the document and appear to be the originator, he can likewise provide the document with his digital watermark. This can lead to the paradoxical situation in a legal dispute that both opposing parties can verify their watermark in the document at issue and each one can accuse the other of the unauthorized copy.

In such a case, the court can only pass correct judgment when the true originator can also prove a document that does not have either watermark or that only has his watermark, and not that of the opposing party. However, it can be impossible to provide such a proof, especially when working with very voluminous documents that are only available in one copy provided with a digital watermark, on one publicly accessible server.

SUMMARY OF THE INVENTION

The present invention enables the true originator to verify his intellectual property, beyond any dispute, even in such difficult cases.

This is rendered possible by the method as set forth herein. In an embodiment, the method provides for generating digital watermarks for electronic documents, where the owner of a document hides a digital watermark as proof of identity id in the document. Prior to being hidden, the watermark is not only provided with the proof of identity id, but also at least with the hash value h(m) of the document, and with a secret key for making the watermark visible. To verify true authorship, the embodiment further allows that the reversibly embedded watermark(s) are removed again with the assistance of the secret key(s) in order to restore the document to its original state, i.e., to check it on the basis of its hash values. The method is reversible and the digital watermark can be separated again from the documents for purposes of checking the identity of the owner.

In a further embodiment, prior to being hidden, the digital watermark is not only provided with the proof of identity id, but also with an authentic time stamp, which, besides the time value t, also contains at least the hash value h(m) of the document, and, in addition, defines the embedding sequence. This method is further refined to be even more secure to enable proof of third-party attacks to be established.

In a further embodiment, to check the ownership of an electronic document in which a plurality of different watermarks were embedded, all embedded watermarks are removed, for example, under consideration of the embedding sequence, and the hash value of the thus created document is subsequently generated, which is compared to the individual hash values in the different watermarks in order to determine the original owner.

DETAILED DESCRIPTION

In accordance with the present invention, the watermark is no longer solely dependent upon the identity id of the owner, but is additionally dependent upon document m. For this, a hash value h(m) of document m is generated, and the watermark (id, h(m)) is hidden in the document in accordance with the underlying idea in such a way that, when the watermark is removed, document m can be restored to its original state.

If an attacker were, at this point, to follow the same strategy as described above, the following would occur:

The true originator A files document m' on a server that one obtains when one inserts watermark (a,h(m)) in m.

An attacker B manipulates this document to m' by additionally inserting the watermark (b,h(m')) in m'.

At this point, the court can render a decision in the proceeding by asking the two opposing parties to reveal their watermarks (a) and to then (b) remove them from the document. The court can then calculate the hash value h(m) from the watermark-free document m and check in which of the two watermarks this value is contained.

Alternatively or additionally, the court could also ask each of the two opposing parties to remove his or her watermark and then, from the two different documents m' and m*, calculate the hash values and check in which watermark these hash values are contained.

A further embodiment of the method is based on an authentic time stamp also being entered into the watermark. In this context, such an authentic time stamp is a time value t, together with additional information x, which was provided by an independent institution with a digital signature, for instance in the form of sig(t,x).

In this case, the watermark to be introduced into the document includes an authentic time stamp, where the additional information includes at least the hash value h(m) of document m, and the identity of the owner, e.g., in the forms: (a,sig(t,h(m))) or sig(t,(a,h(m))).

What is claimed is:

1. A method for generating a digital watermark for an electronic document, comprising:
   determining a first hash value of the document;
   generating the watermark as a function of a proof of identity identification and the first hash value of the document;
   providing a secret key for making the watermark visible;
   embedding the watermark in the document;
   restoring the document to an original state by removing the watermark using the secret key;
   determining a hash value of the restored document; and
   verifying ownership of the document by comparing the hash value of the restored document and the first hash value,
   wherein the generating the watermark step includes generating the watermark as a function of the proof of identity identification, the first hash value of the document, and an authentic time stamp.

2. The method as recited in claim 1 wherein the authentic time stamp defines an embedding sequence.

3. The method according to claim 1, wherein the embedding step includes embedding a plurality of different watermarks in the document, and wherein the restoring step includes restoring the document to the original state by removing all of the different watermarks, the method further comprising:
   determining an original owner by comparing respective hash values in each of the different watermarks with the hash value of the restored document.

4. The method according to claim 3, wherein the restoring step includes restoring the document to the original state by removing all of the different watermarks in accordance with an embedding sequence.

5. A method for generating a digital watermark for an electronic document, comprising:
   determining a first hash value of the document;
   generating the watermark as a function of a proof of identity identification and the first hash value of the document;
   providing a secret key for making the watermark visible;
   embedding the watermark in the document;
   restoring the document to an original state by removing the watermark using the secret key;
   determining a hash value of the restored document; and
   verifying ownership of the document by comparing the hash value of the restored document and the first hash value, wherein the generating the watermark step includes generating the watermark as a function of the proof of identity identification, the first hash value of the document, and an authentic time stamp.

6. The method according to claim 5, wherein the embedding step includes embedding a plurality of different watermarks in the document, and wherein the restoring step includes restoring the document to the original state by removing all of the different watermarks, the method further comprising:
   determining an original owner by comparing respective hash values in each of the different watermarks with the hash value of the restored document,
   wherein the restoring step includes restoring the document to the original state by removing all of the different watermarks in accordance with an embedding sequence.

* * * * *